US012147195B2

(12) United States Patent
Charbon et al.

(10) Patent No.: US 12,147,195 B2
(45) Date of Patent: Nov. 19, 2024

(54) BALANCE SPRING FOR A HOROLOGICAL MOVEMENT

(71) Applicant: Nivarox-FAR S.A., Le Locle (CH)

(72) Inventors: Christian Charbon, Chézard-St-Martin (CH); Marco Verardo, Les Bois (CH); Lionel Michelet, Fleurier (CH)

(73) Assignee: NIVAROX-FAR S.A., Le Locle (CH)

( * ) Notice: Subject to any disclaimer, the term of this patent is extended or adjusted under 35 U.S.C. 154(b) by 357 days.

(21) Appl. No.: 16/936,682

(22) Filed: Jul. 23, 2020

(65) Prior Publication Data

US 2021/0088971 A1 Mar. 25, 2021

(30) Foreign Application Priority Data

Sep. 20, 2019 (EP) .................................... 19198759

(51) Int. Cl.
*G04B 17/06* (2006.01)

(52) U.S. Cl.
CPC ......... *G04B 17/066* (2013.01); *G04B 17/063* (2013.01)

(58) Field of Classification Search
CPC .... G04B 17/227; G04B 17/06; G04B 17/063; G04B 17/066
See application file for complete search history.

(56) References Cited

U.S. PATENT DOCUMENTS 5,173,134 A * 12/1992 Chakrabarti ............ C22F 1/183 148/670
5,795,413 A * 8/1998 Gorman ................... B21K 1/36 148/668
10,795,317 B2 * 10/2020 Charbon .................. C21D 9/02
11,137,721 B2 * 10/2021 Charbon .............. G04B 17/063
2007/0133355 A1 * 6/2007 Hara ...................... G04B 1/145 368/140
2007/0137742 A1 * 6/2007 Hao ........................ C22C 14/00 420/419
2017/0067137 A1 * 3/2017 Kawasaki ................. B22F 5/10
2017/0146046 A1 * 5/2017 Foltz, IV ................ C22F 1/183
2017/0351216 A1 * 12/2017 Balague ............... G04B 17/325
2018/0016670 A1 * 1/2018 Bryan ...................... C21D 1/26
2018/0373202 A1 * 12/2018 Charbon ................. C22C 14/00

(Continued)

FOREIGN PATENT DOCUMENTS

CN 107710081 A 2/2018
JP 2005140674 A 6/2005
JP 2019113549 A 7/2019

OTHER PUBLICATIONS

Titanium Alloys for Biomedical Applications (Year: 2016).*

(Continued)

*Primary Examiner* — Sean Kayes
(74) *Attorney, Agent, or Firm* — Sughrue Mion, PLLC

(57) ABSTRACT

A balance spring (1) intended to equip a balance of a horological movement, wherein the balance spring (1) is made of a niobium and titanium alloy containing: niobium: the remainder to 100 wt %; titanium with a weight percentage that is greater than or equal to 1 wt % and less than 40 wt %; traces of other elements chosen from among O, H, C, Fe, Ta, N, Ni, Si, Cu and Al, each of said elements being in the range 0 to 1,600 ppm of the total weight, and the sum of said trace elements being less than or equal to 0.3 wt %.

5 Claims, 2 Drawing Sheets

1

(56) References Cited

U.S. PATENT DOCUMENTS

| | | | | |
|---|---|---|---|---|
| 2019/0196406 | A1 | 6/2019 | Charbon | |
| 2020/0308685 | A1* | 10/2020 | Laheurte | G04B 17/066 |

OTHER PUBLICATIONS

Zeng Liying et al, "Progress in High Strength Titanium Alloys for Springs" ,Progress in Titanium industry, vol. 26, No. 5, Oct. 2009, pp. 5-9 ( 5 pages total).

Communication dated Aug. 20, 2021, from the China National Intellectual Property Administration in application No. 202010985588.6.

Communication dated Aug. 17, 2021, from the Japanese Patent Office in application No. 2020136578.

European Search Report for corresponding EP 19 19 8759, dated Mar. 16, 2020.

* cited by examiner

BALANCE SPRING FOR A HOROLOGICAL MOVEMENT

CROSS REFERENCE TO RELATED APPLICATIONS

This application claims priority to European Patent Application No. 19198759.3 filed Oct. 20, 2019, the entire contents of which are incorporated herein by reference.

FIELD OF THE INVENTION

The invention relates to a balance spring intended to equip a balance of a horological movement. It further relates to the method for manufacturing this balance spring.

BACKGROUND OF THE INVENTION

The manufacture of balance springs for horology is subject to restrictions that often appear irreconcilable at first sight:

- the need to obtain a high yield strength,
- an ease of manufacture, particularly of wire drawing and rolling operations,
- an excellent fatigue strength,
- stable performance levels over time,
- small cross-sections.

The production of balance springs is furthermore focused on concern for temperature compensation, in order to guarantee consistent chronometric performance levels. This requires obtaining a thermoelastic coefficient that is close to zero.

Any improvement on at least one of the points, and in particular on the mechanical strength of the alloy used, thus represents significant progress.

SUMMARY OF THE INVENTION

The invention proposes defining a new type of horological balance spring, based on the selection of a specific material, and proposes developing the appropriate manufacturing method.

For this purpose, the invention relates to a horological balance spring made of a niobium and titanium alloy. According to the invention, the titanium content lies in the range 1 wt % (inclusive) to 40 wt % (exclusive). Advantageously, it lies in the range 5 wt % (inclusive) to 35 wt % (inclusive), preferably in the range 15 wt % (inclusive) to 35 wt % (inclusive), and more preferably in the range 27 wt % (inclusive) to 33 wt % (inclusive). The remainder is made of niobium and of impurities, including interstitials such as H, C, N and/or O, the percentage of impurities being less than or equal to 0.3 wt %.

The invention further relates to the method for manufacturing this horological balance spring as claimed in the accompanying claims.

BRIEF DESCRIPTION OF THE DRAWINGS

Other features and advantages of the invention will be better understood upon reading the following detailed description given with reference to the accompanying drawings, in which.

DETAILED DESCRIPTION OF THE PREFERRED EMBODIMENTS

Figure 1:
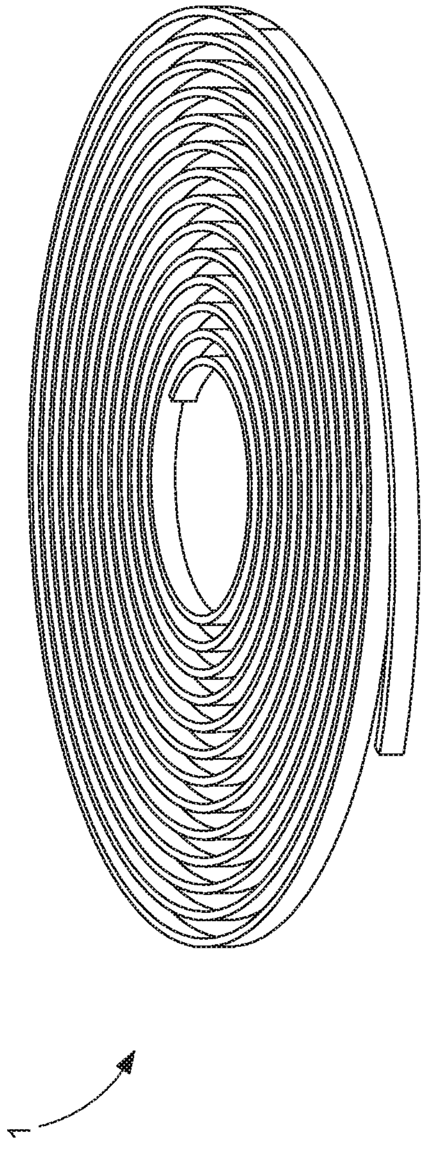
FIG. 1 diagrammatically shows a balance spring made with a Nb—Ti alloy according to the invention.

The invention relates to a horological balance spring made of a binary type alloy comprising niobium and titanium.

According to the invention, this alloy comprises:

- niobium: the remainder to 100 wt %;
- titanium in a weight percentage that is greater than or equal to 1 wt % and less than 40 wt %. More particularly, this alloy comprises a weight proportion of titanium that lies in the range 5 to 35 wt %, preferably in the range 15 to 35 wt % and more preferably in the range 27 to 33 wt %;
- traces of other elements chosen from among O, H, C, Fe, Ta, N, Ni, Si, Cu and/or Al, each of said elements being in the range 0 to 1,600 ppm of the total weight, and the sum of these trace elements being less than or equal to 0.3 wt %. In other words, the total of the weight percentages of titanium and of niobium lies in the range 99.7 wt % to 100 wt % of the total.

The weight percentage of oxygen is less than or equal to 0.10 wt % of the total, or even less than or equal to 0.085 wt % of the total.

The weight percentage of tantalum is less than or equal to 0.10 wt % of the total.

The weight percentage of carbon is less than or equal to 0.04 wt % of the total, in particular less than or equal to 0.020 wt % of the total, or even less than or equal to 0.0175 wt % of the total.

The weight percentage of iron is less than or equal to 0.03 wt % of the total, in particular less than or equal to 0.025 wt % of the total, or even less than or equal to 0.020 wt % of the total.

The weight percentage of nitrogen is less than or equal to 0.02 wt % of the total, in particular less than or equal to 0.015 wt % of the total, or even less than or equal to 0.0075 wt % of the total.

The weight percentage of hydrogen is less than or equal to 0.01 wt % of the total, in particular less than or equal to 0.0035 wt % of the total, or even less than or equal to 0.0005 wt % of the total.

The weight percentage of nickel is less than or equal to 0.01 wt % of the total.

The weight percentage of silicon is less than or equal to 0.01 wt % of the total.

The weight percentage of nickel is less than or equal to 0.01 wt % of the total, in particular less than or equal to 0.16 wt % of the total.

The weight percentage of copper is less than or equal to 0.01 wt % of the total, or even less than or equal to 0.005 wt % of the total.

The weight percentage of aluminium is less than or equal to 0.01 wt % of the total.

Advantageously, this balance spring has a two-phase microstructure comprising niobium in the body-centred cubic beta phase form and titanium in the close-packed hexagonal alpha phase form.

To obtain such a microstructure, and in accordance with the production of a spring, a part of the alpha phase must be precipitated by heat treatment.

The higher the titanium content, the higher the maximum proportion of alpha phase that can be precipitated by heat treatment, which encourages us to seek a high titanium proportion. However, conversely, the higher the titanium content, the more difficult it is to obtain precipitation of the alpha phase at the grain boundary. The appearance of Widmastätten intragranular alpha-Ti type precipitates or intragranular ω-phase precipitates makes deformation of the material difficult, or even impossible, and is thus not suitable for producing a balance spring, meaning that the incorporation of too much titanium in the alloy should be avoided. Moreover, the application of this alloy to a balance spring requires properties capable of guaranteeing maintained timing performances despite the variation in the temperatures of use of a watch incorporating such a balance spring. The thermoelastic coefficient, or TEC, of the alloy is thus very important. In order to form a chronometric oscillator with a balance made of CuBe or nickel-silver, a TEC of +/−10 ppm/° C. must be achieved. The formula connecting the TEC of the alloy and the expansion coefficients of the balance spring and of the balance is provided below:

$$CT = \frac{dM}{dT} = \left(\frac{1}{2E}\frac{dE}{dT} - \beta + \frac{3}{2}\alpha\right) \times 86400 \frac{s}{j\,^{\circ}\text{C.}}$$

The variables M and T are respectively the rate and the temperature. E is the Young's modulus of the balance spring and, in this formula, E, ß and α are expressed in ° C.$^{-1}$.

CT is the thermal coefficient of the oscillator, (1/E. dE/dT) is the TEC of the balance spring alloy, β is the expansion coefficient of the balance and a is that of the balance spring. The cold-rolled beta-phase alloy has a highly positive TEC, and the precipitation of the alpha phase which has a highly negative TEC allows the two-phase alloy to be brought to a TEC close to zero, which is particularly beneficial. However, as mentioned hereinabove, a too high percentage of titanium leads to the formation of fragile phases. A percentage of titanium of less than 40 wt % procures a good compromise between the different properties sought after. Moreover, it is assumed that the interaction between the C, H, N, O interstitials and dislocations present in the alloy, as well as the interaction between the alpha-titanium precipitates and dislocations also play a beneficial role as regards the TEC. The setting of the dislocations in motion as a function of temperature reduces the Young's modulus of the balance spring, which opposes the positive anomaly of the beta phase.

The balance spring produced using this alloy has a yield strength of greater than or equal to 500 MPa and more specifically that lies in the range 500 to 1,000 MPa. Advantageously, it has a modulus of elasticity of less than or equal to 120 GPa and preferably less than or equal to 110 GPa.

The invention further relates to the method for manufacturing the horological balance spring, characterised in that it comprises the successive implementation of the following steps of:

- producing a blank made of an alloy comprising niobium and titanium and more specifically:
  - niobium: remainder to 100 wt %;
  - a weight percentage of titanium greater than or equal to 1 wt % of the total, and less than 40 wt % of the total;
  - traces of other elements chosen from among O, H, C, Fe, Ta, N, Ni, Si, Cu and Al, each of said elements being in the range 0 to 1,600 ppm of the total weight, and the sum of said trace elements being less than or equal to 0.3 wt %;

- beta-type quenching of said blank such that the titanium of said alloy is essentially in the form of a solid solution with beta-phase niobium;
- applying, to said alloy, sequences of deformation followed by a heat treatment. The term 'deformation' is understood herein to mean a deformation by wire drawing and/or rolling. Wire drawing can require the use of one or more drawplates in the same sequence or in different sequences if necessary. Wire drawing is carried out until a wire having a round cross-section is obtained. Rolling can be carried out during the same deformation sequence as the wire drawing, or in another sequence. Advantageously, the last sequence applied to the alloy is a rolling operation, preferably having a rectangular profile that is compatible with the inlet cross-section for a winder spindle. These sequences lead to the production of a two-phase microstructure comprising beta-phase niobium and alpha-phase titanium, with a yield strength greater than or equal to 500 MPa and a modulus of elasticity less than or equal to 120 GPa and preferably 110 GPa;
- winding to form a balance spring, followed by a final heat treatment.

In these coupled deformation-heat treatment sequences, each deformation is carried out with a given deformation ratio that lies in the range 1 to 5, this deformation ratio satisfying the conventional formula 21n(d0/d), where d0 is the diameter of the last beta quench, and where d is the diameter of the cold-rolled wire. The overall cumulation of the deformations for the entirety of this succession of sequences produces a total deformation ratio that lies in the range 1 to 14. Each coupled deformation-heat treatment sequence comprises, on each instance, an alpha-phase Ti precipitating heat treatment.

The beta quench prior to the deformation and heat treatment sequences is a dissolving treatment, the duration whereof lies in the range 5 minutes to 2 hours at a temperature that lies in the range 700° C. to 1,000° C., in a vacuum, followed by cooling in a gas.

Even more particularly, this beta quench is a dissolving treatment, lasting 1 hour at 800° C. in a vacuum, followed by cooling in a gas.

Referring back to the coupled deformation-heat treatment sequences, the heat treatment is a precipitation treatment, the duration whereof lies in the range 1 hour to 200 hours at a temperature that lies in the range 300° C. to 700° C. More particularly, the duration lies in the range 5 hours to 30 hours at a temperature that lies in the range 400° C. to 600° C.

More particularly, the method comprises between one and five coupled deformation-heat treatment sequences More particularly, the first coupled deformation-heat treatment sequence comprises a first deformation with at least a 30% section decrease.

More particularly, each coupled deformation-heat treatment sequence, aside from the first, comprises a deformation between two heat treatments with at least a 25% section decrease.

More particularly, after this production of said alloy blank, and before the deformation-heat treatment sequences, in an additional step, a surface layer of ductile material, taken from among copper, nickel, cupronickel, cupromanganese, gold, silver, nickel-phosphorus Ni—P and nickel-boron Ni—B or similar, is added to the blank to ease the wire shaping operation during deformation. Moreover, after the deformation-heat treatment sequences or after the winding step, the layer of the ductile material is removed from the wire, in particular by etching.

In an alternative embodiment, the surface layer of ductile material is deposited so as to form a balance spring, the pitch whereof is not a multiple of the thickness of the strip. In another alternative embodiment, the surface layer of ductile material is deposited so as to form a spring, the pitch whereof is variable.

In a specific horological application, ductile material or copper is thus added at a given time to facilitate the wire shaping operation, so that a thickness of 10 to 500 micrometres remains on the wire, which has a final diameter of 0.3 to 1 millimetre. The layer of ductile material or copper is removed from the wire, in particular by etching, then the wire is rolled flat before the actual manufacture of the spring itself by winding.

The addition of ductile material or copper can be galvanic or mechanical; in this case it is a sleeve or a tube of ductile material or copper, which is adjusted on a niobium-titanium alloy bar with a large diameter, which is then thinned out during the steps of deforming the composite bar.

A diffusion barrier layer, for example nb, can be added between the nb-Ti and the Cu to prevent the formation of intermetallics which are detrimental to the deformability of the material. The thickness of this layer is chosen such that it corresponds to a thickness of 100 nm to 1 μm on the wire having a diameter of 0.1 mm.

The removal of the layer can in particular be carried out by etching with a cyanide-based or acid-based solution, for example nitric acid.

By an appropriate combination of deformation and heat treatment sequences, an ultra-thin lamellar two-phase microstructure can be obtained, in particular a nanometric microstructure, comprising or composed of beta-phase niobium and alpha-phase titanium. This alloy combines a very high yield strength, greater than at least 500 MPa, and a very low modulus of elasticity, in the order of 80 GPa to 120 GPa. This combination of properties is well suited to a balance spring. After the deformation-heat treatment sequences, the alloy has a texture <110>. Moreover, this niobium-titanium alloy according to the invention is easily covered with a ductile material or copper, which considerably eases the deformation thereof by wire drawing.

A binary-type alloy containing niobium and titanium, of the type selected hereinabove for implementing the invention, also has a similar effect to that of "Elinvar", with a thermoelastic coefficient of virtually zero in the usual operating temperature range for watches, and suitable for the manufacture of self-compensating balance springs.

Figure 2:
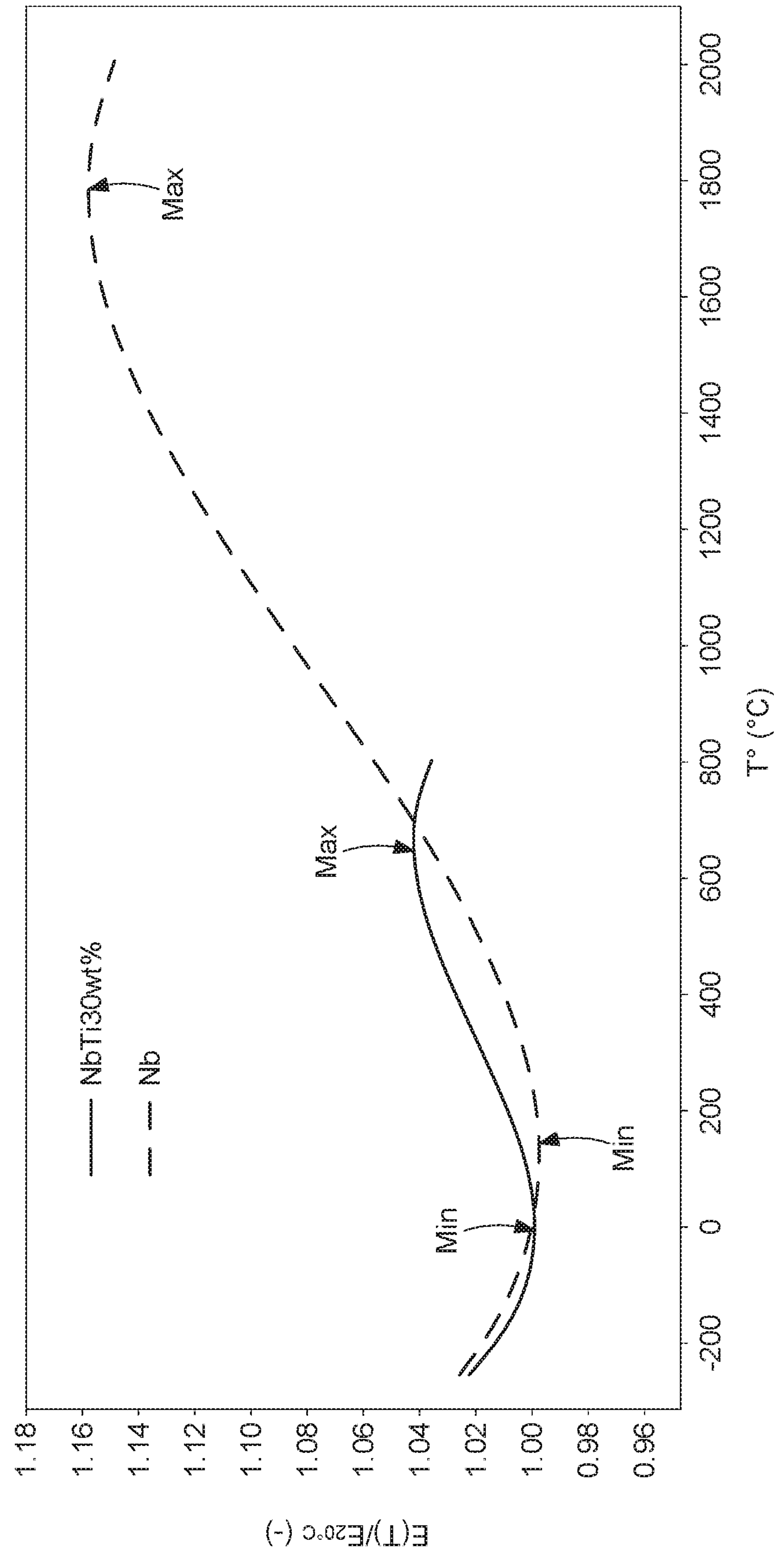
FIG. 2 shows the evolution curves of the Young's modulus as a function of the temperature, calculated over the Young's modulus at 20° C. respectively for pure Nb and a Nb—Ti alloy according to the invention containing 30 wt % Ti.

More specifically, when comparing, in FIG. 2, the evolution of the Young's modulus ($E(T)/E_{20° C.}$) as a function of the temperature for pure Nb and a Nb—Ti alloy according to the invention containing 30 wt % Ti, the two curves are seen to be S-shaped with the notable difference that the presence of Ti considerably reduces the difference between the minimum and the maximum of the curve along both the X-axis and the Y-axis. More specifically, the presence of Ti in the alloy and the manufacturing method according to the invention tend to smooth the curve by reducing the curve's maximum. This positive effect on reducing the maximum with the alloy according to the invention is the result of a plurality of factors, which are:

- the crystallographic texture of the alloy, which is influenced by the reduction ratio from the beta quench,
- the dislocation density adjusted via the heat treatments which induce recovery or even recrystallisation phenomena,
- the concentration of interstitials which will interact with the dislocations,
- the percentage of alpha-phase Ti,
- the density of the precipitates in the alloy (number of alpha-phase Ti precipitates per unit of volume).

The invention claimed is:

1. A balance spring (1) intended to equip a balance of a horological movement, characterised in that the balance spring (1) is made of a niobium and titanium alloy containing:

- niobium: the remainder to 100 wt %;
- titanium with a weight percentage that is greater than or equal to 1 wt % and less than 40 wt %,
- traces of other elements chosen from one or more of O, H, C, Fe, Ta, N, Ni, Si, Cu and/or Al, each of said elements being in the range of 0 to 1,600 ppm of the total weight, and the sum of said trace elements being less than or equal to 0.3 wt %,
- wherein the balance spring (1) has a two-phase microstructure comprising niobium in the beta phase form and titanium in the alpha phase form,
- wherein the two-phase microstructure is composed of niobium in the beta phase form and titanium in the alpha phase form.

2. The balance spring (1) according to claim 1, wherein said alloy comprises a weight percentage of titanium that lies in the range 5 to 35 wt %.

3. The balance spring (1) according to claim 1, wherein said alloy comprises a weight percentage of titanium that lies in the range 15 to 35 wt %.

4. The balance spring (1) according to claim 1, wherein said alloy comprises a weight percentage of titanium that lies in the range 27 to 33 wt %.

5. The balance spring (1) according to claim 1, wherein the balance spring (1) has a yield strength greater than or equal to 500 MPa and a modulus of elasticity less than or equal to 120 GPa.

* * * * *